(12) United States Patent
Colburn et al.

(10) Patent No.: US 8,609,238 B2
(45) Date of Patent: Dec. 17, 2013

(54) METHOD AND MATERIAL FOR A THERMALLY CROSSLINKABLE RANDOM COPOLYMER

(75) Inventors: Matthew E. Colburn, Schenectady, NY (US); Gregory Breyta, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/156,669

(22) Filed: Jun. 9, 2011

(65) Prior Publication Data

US 2011/0256359 A1 Oct. 20, 2011

Related U.S. Application Data

(62) Division of application No. 12/015,825, filed on Jan. 17, 2008, now Pat. No. 8,017,194.

(51) Int. Cl.
*B32B 5/00* (2006.01)
*B32B 27/18* (2006.01)
*B32B 27/28* (2006.01)
*B32B 27/30* (2006.01)

(52) U.S. Cl.
USPC ............ 428/333; 428/339; 428/500; 428/523

(58) Field of Classification Search
None
See application file for complete search history.

(56) References Cited

U.S. PATENT DOCUMENTS

| | | | |
|---|---|---|---|
| 7,521,094 B1 | 4/2009 | Cheng et al. | |
| 2001/0019037 A1 | 9/2001 | Zakhidov et al. | |
| 2002/0051928 A1 | 5/2002 | Zampini | |
| 2003/0100675 A1 | 5/2003 | Goetz et al. | |
| 2006/0134556 A1 | 6/2006 | Nealey et al. | |
| 2007/0212795 A1* | 9/2007 | Milkove et al. | 438/3 |
| 2007/0224236 A1 | 9/2007 | Boden | |
| 2008/0008955 A1* | 1/2008 | Brodsky et al. | 430/270.1 |
| 2008/0193658 A1* | 8/2008 | Millward | 427/401 |
| 2008/0299353 A1 | 12/2008 | Stoykovich et al. | |
| 2009/0093114 A1* | 4/2009 | Burns et al. | 438/637 |

OTHER PUBLICATIONS

Nanopatterning with Microdomains of Block Copolymers using Reactive-Ion Etching Selectivey; Koji Asakawa and Toshiro Hiraoka; Jpn. J. Appl. Phys. vol. 41 (2002), pp. 6112-6118.
Highly Oriented and Ordered Arrays from Block Copolymers via Solvent Evaporation; Seung Hyun Kim et al.; Advanced Materials 2004, 16, No. 3, pp. 226-231.
Ultrahigh-Density Nanowire Arrays Grown in Self-Assembled Diblock Copolymer Templates; t. Thurn-Albrecht et al.; Science vol. 290 Dec. 15, 2000, pp. 2126-2129.
Integration of self-assembled diblock copolymers for semiconductor capacitor fabrication; C.T. Black et al.; Applied Physics Letters vol. 79, No. 3, Jul. 16, 2001; pp. 409-411.
Enhancement in the Orientation of the Micordomain in Block Copolymer Thin Films upon the Addition of Homopolymer; Unyong Jeong et al.; Advanced Materials 2004 16, No. 6, Mar. 18.

* cited by examiner

*Primary Examiner* — Ramsey Zacharia

(74) *Attorney, Agent, or Firm* — Novak Druce Connolly Bove + Quigg LLP

(57) ABSTRACT

A structure that comprises a substrate; a cross-linked random free radical copolymer on the substrate; and a self-assembled patterned diblock copolymer film on the random copolymer; wherein the random copolymer is energy neutral with respect to each block of the diblock copolymer film. A method of making the structure is provided.

7 Claims, 2 Drawing Sheets

Figure 2a. Generate Topography

Figure 2b. Coat Diblock

Figure 2c. Anneal Diblock

Figure 2d. Develop pattern

Figure 2e. Transfer Pattern

METHOD AND MATERIAL FOR A THERMALLY CROSSLINKABLE RANDOM COPOLYMER

CROSS-REFERENCE TO RELATED APPLICATIONS

This application is a divisional application of U.S. patent application Ser. No. 12/015,825, filed Jan. 17, 2008, the entire contents of which are incorporated herein by reference in its entirety.

DESCRIPTION

1. Technical Field

The present disclosure relates to the fabrication of convolved self-assembled structures with deterministic patterning methodologies, and more specifically to nanostructures obtained using polymeric self-assembly generated over a simple cross-linked polymeric underlayer.

2. Background

The use of bottom-up approaches to semiconductor fabrication has grown in interest within the scientific community (for example see Thurn-Albrecht et al, Ultrahigh Nanowire Arrays Grown in Self-Assembled Diblock Copolymer Templates, *Science* 290, 2126-2129, 2000 and Black et al. Integration of Self-Assembled Diblock Copolymers for Semiconductor Capacitor Fabrication, *Applied Physics Letters*, 79, 409-411, 2001). One such approach utilizes block copolymers for generating sub-optical ground rule patterns. In particular, one illustrative use involves forming a 'honeycomb' structure with a poly (methyl methacrylate-b-styrene) block copolymer. In the case of a cylindrical phase diblock having a minor component of PMMA, the PMMA block can phase separate to form vertically oriented cylinders within the matrix of the polystyrene block upon a thermal anneal (Thurn-Albrecht et al, supra and Black et al. supra).

This process is shown in FIGS. 1a-1c. A substrate PA2-100 is optionally coated with a random copolymer PA2-110. This copolymer is affixed to the surface and excess material is removed. A block copolymer PA2-120 is coated on the top surface of the random-substrate stack as shown in FIG. 1a. A key attribute of this approach is that the neutral surface energy underlayer copolymer be covalently bound to the substrate such that it is not removed during the application of the subsequent diblock layer. Further, this underlayer polymer is prepared so that it will form a polymeric brush, i.e., having a single reactive end group introduced by a special initiator. Also typical is the requirement that this underlayer polymer have relatively monodisperse molecular weight distribution. A requirement of the substrate is that it has the necessary reactivity for the end group of the polymeric brush to covalently bond to it. The block copolymer PA2-120 is annealed with heat and/or in the presence of solvents, which allows for phase separation of the immiscible polymer blocks PA2-121 and PA2-122 as shown in FIG. 1b. The annealed film is then developed by a suitable method such as immersion in a solvent/developer which dissolves one polymer block and not the other, and reveals a pattern PA2-123 that is commensurate with the positioning of one of the blocks in the copolymer. For simplicity, in FIG. 1c the block is shown as completely removed although this is not required.

Since block copolymers have a natural length scale associated with their molecular weight and composition, the morphology of a phase-separated block copolymer can be tuned to generate cylinders of a specific width and on a specific pitch. Literature shows the use of UV exposure to cause the polymethylmethacrylate (PMMA) component of a typical diblock copolymer to decompose into smaller molecules (see Thurn-Albrecht et al, supra) and, further, developed using glacial acetic acid to remove the small molecules. Others simply develop acetic acid to reveal the HCP (Hexagonal closed packed or hexagonal array of cylinders) pattern (Black et al. supra). A third possible development technique involves using an oxygen plasma, which preferentially etches, for example, PMMA at a higher rate than polystyrene, the other component of a typical diblock copolymer (see Akasawa et al., Nanopatterning with Microdomains of Block Copolymers for Semiconductor Capacitor Fabrication, *Jpn. J. Appl. Phys.* Vol 41, 2002, pp 6112-6118).

Recent literature demonstrates the self-aligned formation of diblock copolymers within lithographically defined regions on a substrate. This process is shown in FIGS. 2a-2e. In FIG. 2a, topography 3140 in a material 3130 is generated lithographically on a stack of materials 3120, 3110 on a substrate 3100. The material stack 3120 and 3110 can represent a single material or a stack of materials individually. In FIG. 2b, a Diblock copolymer film 3150 is coated over the topography. In FIG. 2c, the film is annealed allowing for phase separation in two individual components 3151 and 3152. In principle, there may be two or more domains. In FIG. 2d, a single domain of the Diblock is developed revealing the pattern 3160. In principle, the pattern can be within the trough or on top of the trough 3140 (shown in FIG. 2a). The Diblock can be partially developed as well. The resulting pattern can then be transferred into the material stack to generation a pattern 3170 as shown in FIG. 2e.

Thus, previous embodiments entail forming an underlayer of neutral surface energy [see Huang PhD Thesis, U. Mass, 1999] polymeric brushes of narrow polydispersity and limited reactivity requiring a suitably reactive underlayer. This requires a reactive end group on the polymer brush to be introduced via a specially prepared initiator that was also typically utilized to control the molecular weight and polydispersity of the copolymer. This provides only a single reactive end group per chain with which to bind to a suitable reactive substrate, e.g., the silanol groups on a $SiO_2$ substrate. This is a limitation of this process. Additionally the reactivity of this system is limited by the single reactive site of the end group requiring relatively long processing times. If the polymer brushes are not covalently bound to the substrate they would be removed during application of the subsequent diblock layer and formation of the aligned self-assembled domains would not occur or be hampered. To this is added synthetic complexity of preparing suitable initiators and unconventional polymerization techniques.

SUMMARY OF DISCLOSURE

This disclosure relates to a structure comprising;
a substrate;
a layer of a cross-linked random free radical copolymer over the substrate;
and a self-assembled patterned diblock copolymer film on the random copolymer; wherein the random copolymer is energy neutral with respect to each block of the diblock copolymer film.

In addition, the present disclosure relates to a method for providing a structure which comprises:
providing over a substrate a layer of a random free radical copolymer;
forming a film of a diblock copolymer on the random free radical copolymer;

wherein the random copolymer is energy neutral with respect to each block of the diblock copolymer film;

and further processing to thereby create a combined self-assembled pattern.

In other words, the present disclosure utilizes a crosslinked copolymer providing a neutral surface energy film over which a diblock polymer composition and process is performed that allows for a self-assembled structure to form. This underlayer can be produced using standard free radical polymerization processes and typical initiators and requires no special reactivity of the underlying substrate. Even in these cases it is found that improvements in processing and domain formation are achieved by the addition of the crosslinking component to the copolymer.

Still other objects and advantages of the present disclosure will become readily apparent by those skilled in the art from the following detailed description, wherein it is shown and described only in the preferred embodiments, simply by way of illustration of the best mode. As will be realized, the disclosure is capable of other and different embodiments, and its several details are capable of modifications in various obvious respects, without departing from the intent of this disclosure. Accordingly, the description is to be regarded as illustrative in nature and not as restrictive.

BEST AND VARIOUS MODES FOR CARRYING OUT DISCLOSURE

Figure 1A:
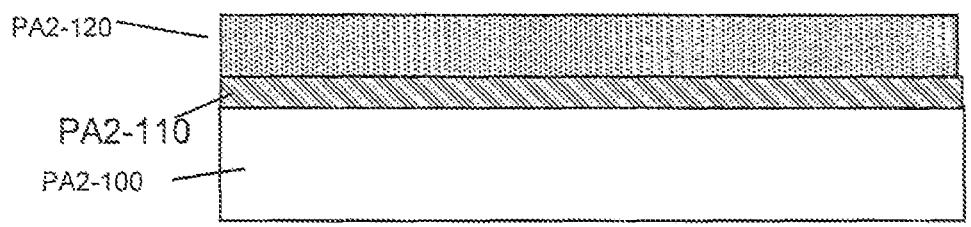
FIGS. 1a-1c are schematic diagrams illustrating a prior art process.
Figure 1B:
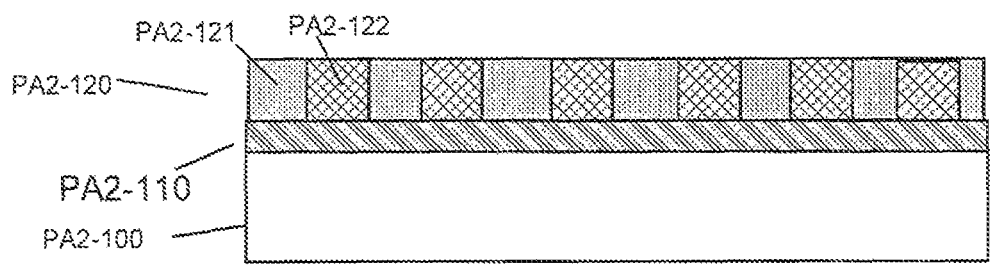
Figure 1C:
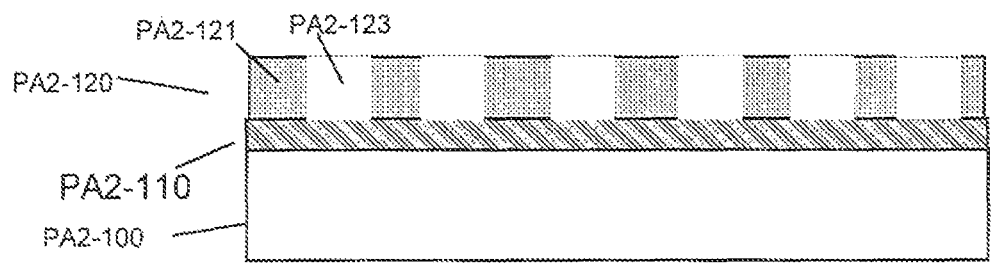
Figure 2:
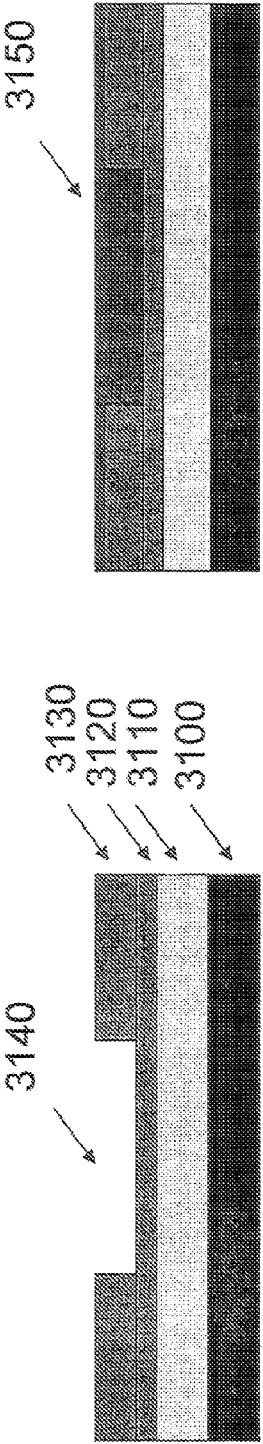
FIGS. 2a-2e are schematic diagrams illustrating an alternative prior art process.
Figure 2:
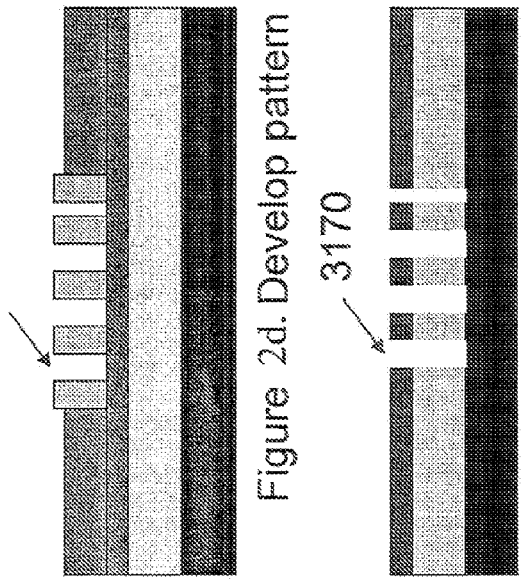
Figure 2:
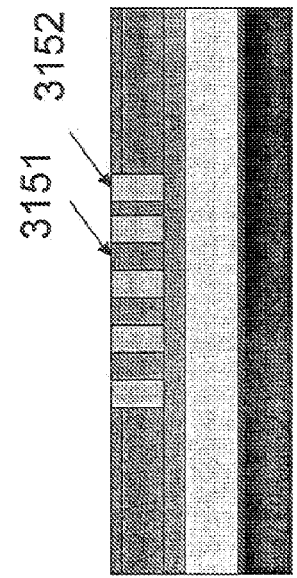

The present disclosure utilizes a crosslinked copolymer providing a neutral surface energy film over which a diblock polymer composition and process is performed that allows for a self-assembled structure to form. This underlayer can be produced using standard free radical polymerization processes and typical initiators and requires no special reactivity of the underlying substrate.

In one embodiment of the present disclosure, an energetically neutral copolymer is provided which comprises crosslinkable units to immobilize a film of the copolymer after being applied to a substrate. The copolymer is typically, but not necessarily, a random free radical copolymer that contains minority component(s)/monomer(s) which are copolymerized into the random copolymer and that are capable of enabling crosslinking mechanisms. Examples of such components include but are not limited to single or multifunctional crosslinking monomers. Additionally, the solution with the random copolymer can be formulated with other components that enable or promote reaction. Examples of such components are thermal acid generators, photoacid generators, photobase generators, thermal base generators, bases, acids or combinations thereof.

Using such formulated random copolymer solutions, a film of the random copolymer may be coated on a substrate not previously compatible with traditional 'silanol'-based polymer brush formations. The random copolymer once coated may be post baked to drive off excess solvent and/or thermally crosslinked. Optionally, the crosslinking may occur after exposure to an actinic light source with an optional bake. Subsequent to random crosslinking, a film of the diblock copolymer is then coated over the random copolymer. The structure is then subjected to a thermal anneal sequence that ramps above the glass transition temperature of the film of the diblock copolymer, which may be less than that of the diblock polymer in its un-plasticized state. The diblock polymer film is allowed to organize into its energetically favored state. The film of the diblock polymer is allowed to cool. The film of the diblock polymer is then developed to reveal a combined self-assembled pattern.

Typical anneal temperatures are on the order of about 100° C. to about 200° C. for polymers with a glass transition temperature of at least about 100° C.; but more typically for diblocks and brush-based randoms >160° C. for the poly (styrene-b-MMA) systems. The addition of the thermal acid generators and/or photoacid generators allow for shorter and/or lower temperature bakes closer to about 100° C. to about 150° C. although they are compatible with higher temperature bakes as well.

The actinic light employed refers to any wavelength to which the diblock formulation is sensitive and is typically less than about 450 nm and more typically less than about 365 nm.

The thickness of film of the random copolymer is typically about 3 nanometers to about 1000 nanometers and more typically about 5 nanometers to about 200 nanometers. Traditional 'silanol based polymer brushes' are on the order of about 5 nm to about 12 nm in thickness. The augmented thickness of the random copolymer film is a benefit over the prior art. The thickness of film of the diblock copolymer is typically about 10 nm to about 200 nm and more typically about 25 nm to about 80 nm. The target thickness of the diblock is linked directly to the polymer molecular weight and occurs in repeating block increments.

The random copolymer employed according to this disclosure is energy neutral with respect to each block of the diblock copolymer. In other words, the random copolymer does not interact preferentially with any of the blocks of the diblock copolymer. According to certain aspects of the disclosure, the monomers that are present in the random copolymer are the same monomers that form the dibock polymer. This ensures energy neutrality for at least some composition of the monomers. Other methods can be utilized that balance the surface energy components as well. However, below are disclosed some of the most readily accessible means of generating a neutral surface.

Typical random copolymers employed according to this disclosure include (meth)acrylic acid esters (such as methyl methacrylate and isobutyl methacrylate); styrenic monomers (such as styrene and α-methyl styrene); vinylics (such as ethylene, propylene, vinyl acetate and vinyl chloride) and silicon containing materials (such as silisesquioxanes, carbosilanes, silanes and silizanes). The random copolymers include a cross-linkable monomer containing alkoxysilanes; (for example trimethoxysilane (TMOS)), epoxides (such as gycidyl methacrylate (GMA)); styrenics (such as PHOST (phenoxystyrene)) and alcohols (such as HEMA and HEPA). The formulations may include reactive diluents such as multifunctional ureas and multifunctional acrylates such as 2-ethoxy methacrylate and n-heptyl acrylate, thermal acid generators, photoacid generators, and quenchers such as weak bases to prevent inadvertent crosslinking. Typically, the photosensitive systems are sensitive to ~20 mJ/cm$^2$ in conjunction with the presence of photoacid generators (and baked at an appropriate temperature.)

The amount of the reactive monomer in the random copolymer is typically a positive amount of <10 mole % of the composition, more typically a positive amount of <5 mole % and even more typically a positive amount of <3 mole %.

The diblock polymers provide for a so-called self-assembly and include two immiscible polymer blocks A and B covalently bonded at one end. If the molecules are given sufficient mobility (e.g., by annealing, by applying an external electric field, or by other means), the two polymer blocks microphase separate, forming ordered arrays of various morphologies.

Diblock copolymer phase morphologies include spherical, cylindrical, gyroid, and lamellar phases. The phase is typically determined by the relative molecular weight ratio of the two polymer blocks composing the diblock copolymer molecule. Typical ratios are: >80/20 for a spherical phase, between about 60/40 and about 80/20 for a cylindrical phase, and between about 40/60 and about 60/40 for the lamellar phase. Exact compositional range for each structure is dependent on the system but these are provided as a reference. The characteristic dimensions of domains in self-assembled diblock copolymer films are typically about 5 to about 200 nanometers and more typically about 10 nanometers to about 100 nanometers. The domain dimensions can be controlled by changing the total molecular weight of the copolymer molecule. Again, the morphology is defined by the mole fraction composition. Typically, the diblock copolymer total molecular weight is in the range of about 10,000-about 200,000 g/mol for self-assembled thin films that assemble in reasonable times.

Examples of suitable diblock copolymers are polymethylmethacrylate-polystyrene or any of the following or similar: polybutadiene-polybutylmethcrylate, polybutadiene-polydimethylsiloxane, polybutadiene-polymethylmethacrylate, polybutadiene-polyvinylpyridine, polyisoprene-polymethylmethacrylate, polyisoprene-polyvinylpyridine, polybutylacrylate-polymethylmethacrylate, polybutylacrylate-polyvinylpyridine, polyhexylacrylate-polyvinylpyridine, polyisobutylene-polybutylmethacrylate, polyisobutylene-polydimethoxysiloxane, polyisobutylene-polymethylmethacrylate, polyisobutylene-polyvinylpyridine, polyisoprene-polyethyleneoxide, polybutylmethacrylate-polybutylacrylate, polybutylmethacrylate-polyvinylpyridine, polyethylene-polymethylmethacrylate, polymethylmethacrylate-polybutylacrylate, polymethylmethacrylate-polybutylmethacrylate, polystyrene-polybutadiene, polystyrene-polybutylacrylate, polystyrene-polybutylmethacrylate, polystyrene-polybutylstyrene, polystyrene-polydimethoxysiloxane, polystyrene-polyisoprene, polystyrene-polymethylmethacrylate, polystyrene-polyvinylpyridine, polyethylene-polyvinylpyridine, polyvinylpyridine-polymethylmethacrylate, polyethyleneoxide-polyisoprene, polyethyleneoxide-polybutadiene, polyethyleneoxide-polystyrene, polyethyleneoxide-polymethylmethacrylate. The benefit of the above structures is determined on a case by case basis. For example, the polyethyleneoxide-polymethylmethacrylate diblock polymer exhibits definitive solubility differences that enable selective removal.

A benefit of the above structures containing both the random and diblock copolymers is their high sensitivity to UV light. Typically, these systems are sensitive to ~20 mJ/cm2. This is approximately 1000× more sensitive then the α-methyl styrene or MMA diblock copolymers reported in the literature.

Those functionalized random formulations that impart a higher dose sensitivity than the prior art allow for reduced processing. As shown in Du et al., Additive-Driven Phase-Selective Chemistry in Block Copolymer Thin Films: The Convergence of Top-Down and Bottom-Up Approaches, *Advanced Materials,* 2004, 16, No. 12, pages 953-957, June 17, Wiley-VCH Verlag GmbH & Co. KGaA, Weinheim, an initial exposure is used for photoimaging, but a subsequent high intensity dose is used for photodecomposition of the α-methylstyrene. Typically, low doses are less than about 100 mJ/cm$^2$ and high doses are typically greater than about 100 mJ/cm$^2$ and more typically about 0.5 J/cm$^2$ to about 10 J/cm$^2$. This disclosure allows for a photo-induced solubility switch that in turn provides for improved processability.

Benefits of the above structures are determined on a case by case basis. For example, a polyethyleneoxide-polymethylmethacrylate diblock polymer exhibits definitive solubility differences that enable selective removal. Additionally, diblock copolymers of polydimethylsiloxane, polycarbosilanes, polysilsesquioxanes, and polymethylsilsesquioxanes with organic blocks provide larger changes in etch selectivity.

In another embodiment, the energy neutral copolymer film contains a thermally activated catalyst such as a thermal acid generator (TAG) to assist in controlling cross-linking reactivity. Examples of TAGs are nitrobenzyl sulfonates and phthalimido sulfonates. These are typically present in positive amounts of <10 mole % by weight and more typically positive amounts of <5 mole % by weight.

In a still further embodiment, the cross-linking can take place by utilizing a reactive co-monomer along with a cross-linking additive rather than by relying solely on the reactivity of the copolymer. Examples of suitable components are multifunctional melamines, glycourils, benzylic alcohols, azides, epoxides and furans. Examples of these are tetrakis(methoxymethyl)glycouril, triphenylolmethane triglygidyl ether and trisglycidyl isocyanurate. These are typically present in positive amounts of <10 mole % and more typically about 2 to about 5 mole %.

The following non-limiting examples are presented to further illustrate the present disclosure.

EXAMPLE 1

Random Copoly(Styrene-Methyl Methacrylate) with Reactive Benzylic Alcohol End Group Prepared by Nitroxide-Mediated Free Radical Polymerization Styrene (4.8 g), methyl methacrylate (3.0 g), 3-(trimethoxysilyl)propyl methacrylate (0.5 g) and 2,2,5-trimethyl-3-(1'-p-hydroxybenzylethoxy)-4-phenyl-3-azahexane (270 mg) are dissolved in 1-methoxy-2-propanol (18.2 g) in a 3 N RB flask and brought to reflux under gentle nitrogen purge and then refluxed under nitrogen blanket. The reaction is refluxed for 21.5 hours and then precipitated into methanol (500 mL), filtered, rinsed with additional methanol and sucked dry overnight. White polymer (5.4 g) is obtained with Mw/Mn=12,000/10,000=1.2 containing 65 mole % incorporated styrene.

EXAMPLE 2

Random Copoly(Styrene-Methyl Methacrylate-Trimethoxysilylpropyl Methacrylate) by Standard Free Radical Polymerization Styrene (4.8 g), methyl methacrylate (2.85 g), 3-(trimethoxysilyl)propyl methacrylate (0.5 g) and 2,2'-azobis(2-cyanopentane) (0.3 g) are dissolved in 2-butanone (40 mL) and degassed using five vacuum/nitrogen purges. The reaction is refluxed for 24 hours and then precipitated into methanol (1 L), filtered, rinsed with additional methanol and sucked dry overnight. White polymer is obtained with Mw/Mn=10,400/7,200=1.45.

EXAMPLE 3

Random Copoly(Styrene-Methyl Methacrylate-Glycidyl Methacrylate) by Standard Free Radical Polymerization Styrene (4.8 g), methyl methacrylate (2.85 g), glycidyl methacrylate (0.3 g) and 2,2'-azobis(2-cyanopentane) (0.3 g) are dissolved in 2-butanone (40 mL) and degassed using five vacuum/nitrogen purges. The reaction is refluxed for 24 hours and then precipitated into methanol (1 L), filtered, rinsed with additional methanol and sucked dry overnight. A white polymer is obtained with Mw/Mn=16,000/8,300=1.9

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

The foregoing description illustrates and describes the present disclosure. Additionally, the disclosure shows and describes only the preferred embodiments of the disclosure, but, as mentioned above, it is to be understood that it is capable of changes or modifications within the scope of the concept as expressed herein, commensurate with the above teachings and/or skill or knowledge of the relevant art. The embodiments described hereinabove are further intended to explain best modes known of practicing the disclosure and to enable others skilled in the art to utilize the disclosure in such, or other, embodiments and with the various modifications required by the particular applications or used disclosed herein. Accordingly, the description is not intended to limit the invention to the form disclosed herein. Also, it is intended that the appended claims be constructed to include alternative embodiments.

What is claimed is:

1. A structure comprising;
   a substrate;
   a layer of a cross-linked random free radical copolymer on the substrate;
   and a self-assembled patterned diblock copolymer film over the random copolymer;
   wherein the random copolymer is energy neutral with respect to each block of the diblock copolymer film and includes at least one reactive cross-linking component selected from the group consisting of alkoxysilanes, epoxides, styrenics, and alcohols.

2. The structure of claim 1 wherein said cross-linked random free radical copolymer includes at least one monomer selected from the group consisting of (meth)acrylic acid esters; styrenic monomers; and vinylics.

3. The structure of claim 1 wherein said layer of a cross-linked random free radical copolymer further comprises it reactive co-monomer.

4. The structure or claim 3 wherein said reactive co-monomer includes at least one member selected from the group consisting of melamines, glycourils, benzylic alcohols, azides, epoxides, and furans.

5. The structure of claim 1 wherein said layer of a cross-linked random free radical copolymer further comprises a thermally activated TAG to induce crosslinking during heating.

6. The structure of claim 1 wherein said layer off a random copolymer further comprises a photolytically activated PAG to induce crosslinking.

7. The structure of claim 1 wherein said layer of a random copolymer contains basic quenchers to stabilize the formulation from effects of acidic components.

* * * * *